May 23, 1933.  B. E. LUBOSHEZ  1,910,115

PHOTOGRAPHIC APPARATUS AND OBJECTIVE LENS

Filed April 27, 1929  2 Sheets-Sheet 1

INVENTOR
Benjamin E. Luboshez
BY
Richard E. Babcock
ATTORNEY

May 23, 1933.   B. E. LUBOSHEZ   1,910,115
PHOTOGRAPHIC APPARATUS AND OBJECTIVE LENS
Filed April 27, 1929   2 Sheets-Sheet 2
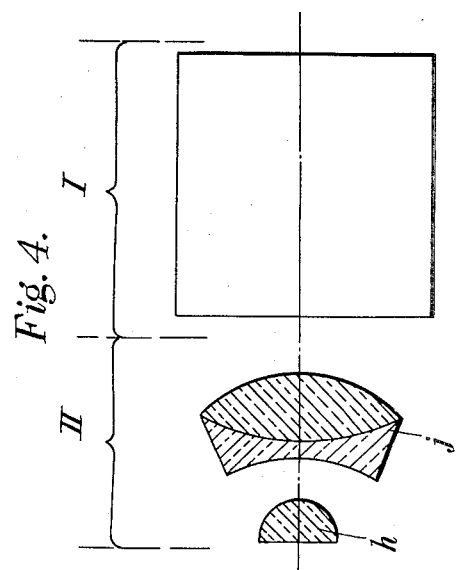
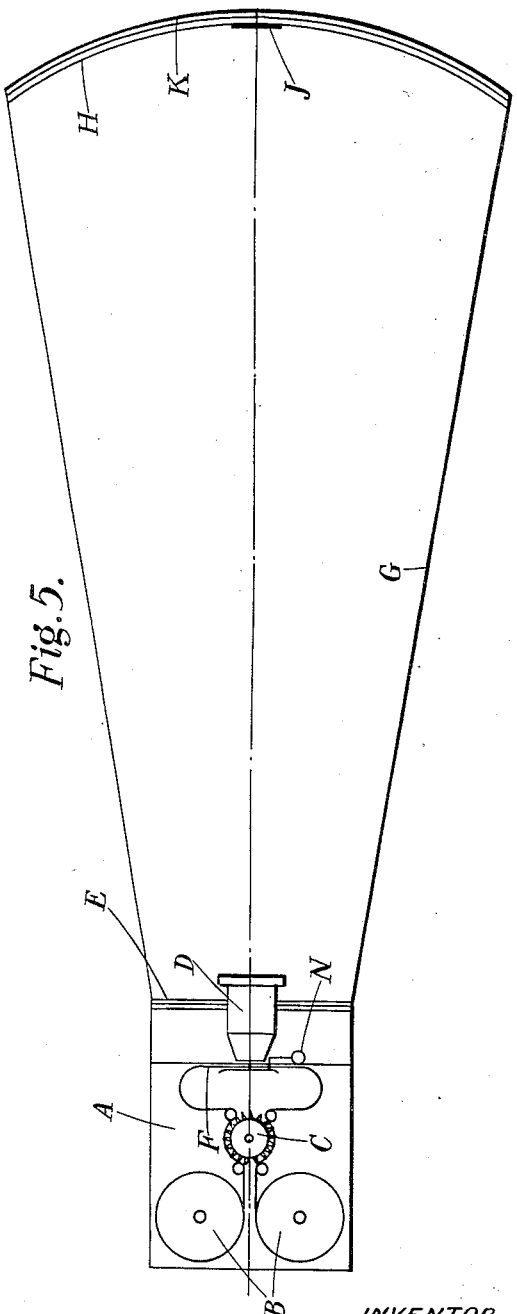

Patented May 23, 1933

1,910,115

UNITED STATES PATENT OFFICE

BENJAMIN ELLAN LUBOSHEZ, OF HARROW, ENGLAND

PHOTOGRAPHIC APPARATUS AND OBJECTIVE LENS

Application filed April 27, 1929, Serial No. 358,643, and in Great Britain May 11, 1928.

The present invention relates to photographic apparatus and objective lenses for use therewith, and more particularly to cameras for taking photographs of X-ray fluorescent screens wherein the light from the screen is focussed upon the photographic emulsion by means of an objective. The X-rays themselves take no part in the formation of the image by the objective, nor are they used to affect the photographic emulsion. Whilst an objective lens according to the present invention is primarily intended for this purpose, a further modification enables it to be used for ordinary photography, the object being to secure exceptionally large aperture. The differences between objectives for these purposes lie in their adaptation for use with objects at fixed or varying distances, a fixed distance being quite easily allowed for with an X-ray screen, with a consequent simplification in the corrections.

A fixed focus camera for X-ray work may consist of an enclosed space having the fluorescent screen at one end and the photographic emulsion at the other with a lens between them, somewhat on the lines of cheap fixed-focus enlargers, the invention lying in the special form of the objective lens as hereinafter described.

This objective is designed to give on the photographic film a flat reduced image of the fluorescent screen, the distances of the object and image planes from the objective being predetermined and fixed. The objective consists of a plurality of simple or compound lenses, one of which is smaller in diameter than the others, this smallest one being turned towards the image plane, which is close up to it. The diameter of the smallest lens of the objective is greater than the diameter of the field of the image.

The design of the objective is based upon the properties of the aplanatic points that exist for every spherical surface separating media of different optical density. It is well known that for such a surface there are (in addition to the centre of curvature) two points on the axis, each of which is the aplanatic image of the other. The term aplanatic is here used in the modern sense and means that not only is there complete absence of spherical aberration for these definite conjugate points but that the sine condition is also fulfilled.

The position of these aplanatic points depends upon the radius of curvature of the surface and the refractive indices of the two media which it separates for the wave length of the particular light under consideration. These conjugate points are both on the same side of the surface as the centre of curvature, with which they are colinear. One of these points is always real and the other is virtual and consequently it is impossible by their means alone to produce a real image of a real object.

The objective may conveniently be considered as consisting of two distinct sections each consisting of one or more lenses. All the lens surfaces are parts of spheres and are co-axial.

The front section, that facing the object, has the function of rendering convergent the divergent rays from points in the object. Alone, this part of the objective would produce a real inverted image of the object at some distance behind the photographic film. It is in general corrected for all important aberrations in much the same way as an ordinary photographic objective or a copying objective except that it need only be corrected for two fixed planes of small angular extent. In the case where substantially monochromatic light from the screen is utilized there need be no chromatic correction, in which case the design of this section of the objective is of extreme simplicity.

The function of the second section of the objective is to render the converging rays from the first part still more convergent and so to produce the final image on the film. This is an essential part of the optical system which makes it possible to utilize relative apertures closely approaching the theoretical limit of 'f' 0.5.

Figure 4, a diagram of an attachment for existing objectives; and

Figure 5 is a diagram of a cinematographic X-ray screen camera embodying the invention.

Figure 1:
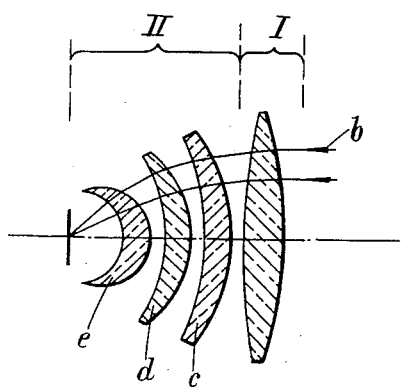
Figure 1 is a diagram of a lens embodying the present invention having a rear component formed of a plurality of meniscus lenses.

Fig. 1 shows the rear component II consisting of three positive meniscus lenses of considerable curvature each with its concave surface facing rearwardly towards the image plane a. These lenses are so arranged that light enters each one directed towards its rearmost aplanatic point and is then refracted and emerges radially from the rear surface directed towards the foremost aplanatic point. Thus the centre of the concave surface of each lens is arranged coincident with both the foremost aplanatic point of that lens and the rearmost aplanatic point of the next lens behind. In this way rays of light b, after being converged by the front component I, enter the front lens c of the component II directed towards the rear aplanatic point of lens c, emerge radially towards the rear aplanatic point of lens d, and finally leave e radially and form an image at the foremost aplanatic point of e.

Figure 2:
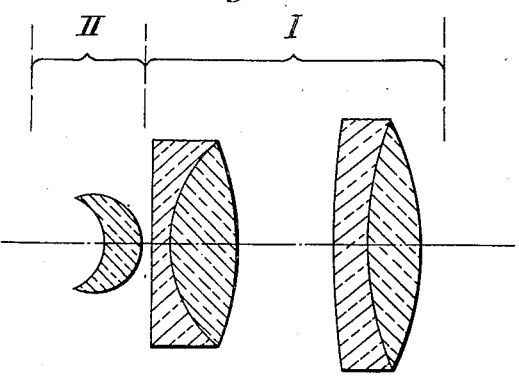
Figure 2 is a similar diagram where the rear component consists of a single lens.

The foregoing arrangement is suitable for use with monochromatic light as is substantially the case with an X-ray fluorescent screen, and as previously mentioned, the front component I, of normal photographic form, need not be chromatically corrected. In this form c, d, or e may be slightly displaced from its true aplanatic position to compensate for aberrations in I. However, the use of more than two lenses in the rear component renders it very difficult to correct the chromatic aberrations introduced, and for photography with ordinary light two lenses only are used in rear component II, the arrangements with respect to their aplanatic points being as above.

Where only one lens is used for the rear component II as shown in Fig. 2, the front component I is over-corrected chromatically to compensate for the chromatic aberration of II.

Figure 3:
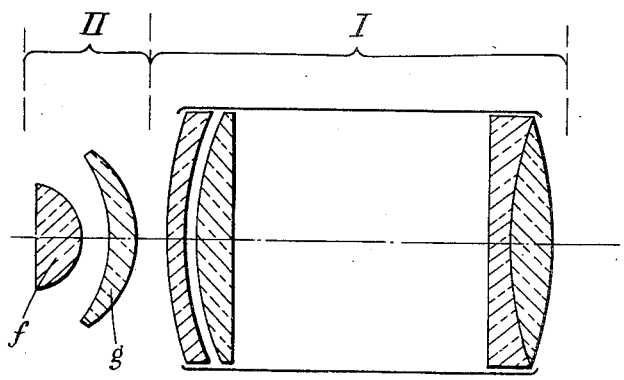
Figure 3 is a diagram of a lens suitable for focussing purposes.

The arrangement of components shown in Fig. 3 is the one which will generally be employed with a focussing objective for photography at varying distances. In this case, as will be gathered from the above requirements as to aplanatic points, the rear component remains at a fixed distance from the sensitive emulsion, and only the front component is moved. It is arranged so that it would focus its image at the rear aplanatic point of the first lens of the rear component, that is, its rays would always enter this lens in the requisite direction as explained. The front component in this case will be more highly corrected, and may be a high class photographic objective of ordinary form, but is preferably over-corrected chromatically in order to compensate for the lack of chromatic correction in the rear component.

Fig. 4 shows a modification in which both components are independently chromatically corrected. The front component may then be used independently. This arrangement is particularly valuable in the case when a highly corrected photographic objective of ordinary form is used as a front component of the objective, in which case the rear component forms an optional back attachment. This back attachment, as before, remains fixed relatively to the emulsion and focussing is carried out by moving the front component as before. In the form shown this back attachment consists of two lenses the smallest one $h$ (that nearest the film) being a thick plano-convex lens with the convex surface facing the incident light. The front lens of the attachment consists of a positive cemented lens $j$ over-corrected chromatically to the extent that the back lens is under-corrected. Externally this lens $j$ is meniscus or plano-convex, the convex surface facing the incident light as before.

Fig. 5 is a diagram of a cinematographic camera embodying the invention and adapted for photographing fluorescent X-ray screens. The camera consists of a casing G, one end of which is closed by the X-ray screen H, and at the other end of which is located a chamber A containing the film F. Chamber A also contains the film operating mechanism shown diagrammatically as consisting of spools B, sprocket C, and pull-down N. Within the camera is a partition E impervious to X-rays, and this partition supports the objective D which will preferably be of the form shown in Fig. 1. A lead button J in the centre of the fluorescent screen H shields the film by preventing direct rays passing through the lens. An outer protective cover K of aluminum may also be provided.

In addition to its use for taking films of moving images on the screen H, such a camera may be passed over a patient to secure a film record similar to the impression that would be obtained by similar movement of the screen when making a visual examination.

What I claim as my invention, and desire to secure by Letters Patent is:—

1. A photographic objective consisting of two positive components, a rear component containing as a last lens a highly curved meniscus lens which receives rays directed towards its farthermost aplanatic point and re-directs them to emerge radially from its concave surface, and a front component directing a cone of image-forming rays toward the farthermost aplanatic point of the rear component.

2. A photographic objective comprising a front component in the form of a highly corrected photographic objective and a rear component corrected as a whole consisting of a plurality of meniscus lenses of considerable curvature with their convex surfaces facing the incident light and each receiving the image-forming rays from the next lens in front in a direction towards its farthermost aplanatic point and directing the rays towards its nearer aplanatic point, and the last one redirecting them radially from its concave surface.

3. A photographic objective consisting of two positive components, a rear component fixed with relation to the image plane containing a lens with a highly curved convex surface facing the incident light, and a front component movable for focussing purposes with respect to the rear component and directing a cone of image-forming rays towards the farthermost aplanatic point of that lens in the rear component which receives said cone, the rearmost surface facing the image plane being concave and re-directing the rays radially from said surface.

4. An auxiliary lens attachment for the rear of a corrected photographic objective corrected as a whole and placed to receive the image-forming rays from the front component in a direction towards its farthermost aplanatic point and to re-direct them towards its nearer aplanatic point containing as a rearmost lens a highly curved meniscus lens with its concave surface facing the image plane and directing the rays radially from said surface.

5. A photographic objective consisting of a front positive image-forming component and a rear positive component placed with its farthermost aplanatic point substantially coincident with the point to which the rays from the front component converge, and adapted to re-converge them substantially towards its nearer aplanatic point, containing as a rearmost lens a highly curved meniscus lens of larger diameter than the field of view and smaller in diameter than the lenses in front of it with its concave surface presented toward the image plane and re-directing the rays radially from said surface.

6. A photographic objective consisting of a front positive image-forming component and a rear positive component placed with its farthermost aplanatic point substantially coincident with the point to which the rays from the front component converge containing a plano-convex lens and, as a rearmost lens, a highly-curved meniscus lens of larger diameter than the field of view and smaller in diameter than the lenses in front of it with its concave surface presented toward the image plane and re-directing the rays radially from said surface.

In testimony whereof I affix my signature.

BENJAMIN ELLAN LUBOSHEZ.